(12) United States Patent
Altmann et al.

(10) Patent No.: US 8,957,122 B2
(45) Date of Patent: Feb. 17, 2015

(54) THERMOPLASTIC MOLDING COMPOSITION COMPRISING MICROENCAPSULATED LATENT-HEAT-ACCUMULATOR MATERIAL

(75) Inventors: Stephan Altmann, Ruppertsberg (DE); Dirk Opfermann, Mannheim (DE); Tina Schroeder-Grimonpont, Rheinzabern (DE); Marco Schmidt, Speyer (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/988,419

(22) PCT Filed: Nov. 21, 2011

(86) PCT No.: PCT/IB2011/055202
§ 371 (c)(1),
(2), (4) Date: May 20, 2013

(87) PCT Pub. No.: WO2012/069976
PCT Pub. Date: May 31, 2012

(65) Prior Publication Data
US 2013/0245147 A1 Sep. 19, 2013

(30) Foreign Application Priority Data
Nov. 24, 2010 (EP) ..................... 10192411

(51) Int. Cl.
| | | |
|---|---|---|
| C08J 5/00 | (2006.01) | |
| C08J 5/18 | (2006.01) | |
| C09K 5/06 | (2006.01) | |
| C08L 47/00 | (2006.01) | |
| C08L 23/06 | (2006.01) | |
| C08L 29/10 | (2006.01) | |

(52) U.S. Cl.
CPC ............... *C08L 47/00* (2013.01); *C09K 5/063* (2013.01); *C08L 23/06* (2013.01); *C08L 29/10* (2013.01); *C08L 2205/20* (2013.01)
USPC ............ 521/143; 428/402.2; 428/402.21; 428/402.22; 428/402.24; 523/334

(58) Field of Classification Search
USPC ............ 521/143; 428/402.2, 402.21, 402.22, 428/402.24; 523/334
See application file for complete search history.

(56) References Cited

U.S. PATENT DOCUMENTS

| | | | |
|---|---|---|---|
| 2,800,457 | A | 7/1957 | Green et al. |
| 3,041,289 | A | 6/1962 | Katchen et al. |
| 4,021,595 | A | 5/1977 | Kiritani et al. |
| 5,224,356 | A | 7/1993 | Colvin et al. |
| 5,456,852 | A | 10/1995 | Isiguro |
| 6,803,090 | B2 * | 10/2004 | Castiglione et al. .......... 428/172 |
| 8,304,075 | B2 * | 11/2012 | Lang-Wittkowski et al. ...... 428/402.24 |
| 2007/0248824 | A1 | 10/2007 | Lang-Wittkowski et al. |
| 2012/0022187 | A1 | 1/2012 | Desbois et al. |

FOREIGN PATENT DOCUMENTS

| | | |
|---|---|---|
| DE | 102 00 316 | 7/2002 |
| DE | 101 39 171 | 2/2003 |
| DE | 101 63 162 | 7/2003 |
| EP | 0 392 876 | 10/1990 |
| EP | 0 535 384 | 4/1993 |
| EP | 0 562 344 | 9/1993 |
| EP | 0 974 394 | 1/2000 |
| EP | 1 029 018 | 8/2000 |
| EP | 1 079 299 | 2/2001 |
| EP | 1 884 358 | 2/2008 |
| GB | 870 476 | 1/1959 |
| JP | 2009 79115 | 4/2009 |
| WO | 98 13412 | 4/1998 |
| WO | 02 24789 | 3/2002 |
| WO | 2006 077056 | 7/2006 |
| WO | 2008 071649 | 6/2008 |
| WO | 2008 116763 | 10/2008 |
| WO | WO 2008/116763 | * 10/2008 |

(Continued)

OTHER PUBLICATIONS

Supplementary European Search Report issued May 26, 2014, in European Patent Application No. 11 84 3996 filed Nov. 21, 2011.

(Continued)

*Primary Examiner* — Nathan M Nutter
(74) *Attorney, Agent, or Firm* — Oblon, Spivak, McClelland, Maier & Neustadt, L.L.P.

(57) ABSTRACT

A thermoplastic molding composition is provided, which comprises A) from 30 to 90% by weight of at least one thermoplastic polymer, B) from 10 to 70% by weight of microcapsules with a capsule core made of latent-heat-accumulator material and a polymer as capsule wall, where the latent-heat-accumulator material has its solid/liquid phase transition in the temperature range from −20° C. to 120° C., and C) from 0 to 60% by weight of one or more further additive, where each of the percentages by weight is based on the total weight of components A) to C) and these give a total of 100% by weight, obtainable via mixing in the melt of components A), B), and optionally C) in a multiscrew extruder, where the multiscrew extruder comprises, along the direction of conveying, in this sequence, at least one feed zone, one plastifying zone, one homogenizing zone, and one discharge zone, and the feed of the microcapsules B) into the multiscrew extruder takes place at a site after—in the direction of conveying—the plastifying zone. And also a process for producing the composition and uses of the composition for producing fibers, foils, moldings, and foams are provided.

17 Claims, No Drawings

(56) References Cited

FOREIGN PATENT DOCUMENTS

| WO | 2009 077525 | 6/2009 |
| WO | 2012 069976 | 5/2012 |

OTHER PUBLICATIONS

International Search Report Issued Mar. 29, 2012 in PCT/IB11/055202 Filed Nov. 21, 2011.

* cited by examiner

THERMOPLASTIC MOLDING COMPOSITION COMPRISING MICROENCAPSULATED LATENT-HEAT-ACCUMULATOR MATERIAL

The present invention relates to thermoplastic molding compositions comprising from 10 to 70% by weight of microcapsules with a capsule core made of latent-heat-accumulator material and a polymer as capsule wall, to a process for producing the composition, and to use of the composition.

In recent years there have been increasing numbers of attempts to find new polymer-based combinations of materials which can replace metals. Composite materials are used in an attempt to achieve mechanical properties. However, it is also desirable that the polymers have a heat-accumulation capacity similar to that of metals.

DE-A-102 00 316 teaches the production of injection-molded plastics parts made of granulated plastic, to which carrier-material particles with latent heat accumulators are added prior to injection into the mold cavity. The capillary spaces of the mineral carrier materials have an absorbent solid structure, within which the latent-heat-accumulator materials are retained. The dimensions of the capillary spaces in the carrier-material particles are in the range from 0.1 to 0.6 mm. However, the admixture of large amounts of a coarse-particle-size additive directly prior to injection leads to inhomogeneity of the material and thus to impaired mechanical properties of the injection-molded plastics part. Furthermore, the heat-accumulation capacity achieved is inadequate in relation to the amount of additive used, since the carrier material accounts for almost half.

EP 1884358 moreover teaches the production of multilayer foils made of a granulated thermoplastic polyurethane material which comprises microencapsulated paraffins with a boiling point of from 25 to 50° C., as blowing agents. The melting point of blowing agents such as pentane and isopentane is −130 and, respectively, −160° C.

WO 02/24789 teaches the production of melt-spun fibers for which a polymer composite is produced by way of a plurality of processing steps, involving further processing of the respective blend obtained. This process is very complicated.

WO 2006/077056 teaches granulated materials made of microencapsulated latent-heat-accumulator material and of film-forming polymeric binders with a glass transition temperature in the range from 40 to 120° C. According to said teaching, an amount of 30% by weight, based on the microcapsules, of the binders is added in the form of an aqueous dispersion to the microcapsules.

U.S. Pat. No. 5,224,356 teaches the use of microencapsulated latent-heat-accumulator materials in an epoxy resin matrix for the cooling of electrical components.

The prior European application 10170160.5 moreover teaches a composite material made of a polymer matrix, e.g. polyurethane, where the matrix surrounds a metallic fiber web and/or metal grid, and also microencapsulated latent-heat-accumulator material. This type of composite material is obtainable by bringing the metallic fiber web and/or metal grid into contact with a reactive organic binder comprising the microcapsules and then hardening the binder. The prior European application 10170161.3 teaches polyamide moldings comprising microencapsulated latent-heat-accumulator materials, where these are obtainable via anionic polymerization of a lactam.

A factor common to all of the teaching is that the composite material is restricted to polymers which have, as starting materials, reactive organic binders which are hardened in the presence of the microcapsules.

The above prior art reveals that the polymers processed are restricted to two groups, those which are not hardened until the microcapsules are present, or those having low glass transition temperatures.

Latent-heat accumulators with a capsule wall based on esters of (meth)acrylic acid with a capsule size of up to 50 μm and a core/wall ratio of from 7/3 to 9/1 have only restricted resistance to mechanical loads, and also to thermal loads, because of their thin walls. They are particularly sensitive to simultaneously thermal and mechanical load.

It was therefore an object of the present invention to provide a polymer blend which has a heat-accumulation capacity of at least 10 J/g, preferably 50 J/g or higher, and also a process permitting production thereof.

This object is achieved via a thermoplastic molding composition comprising
  A) from 30 to 90% by weight of at least one thermoplastic polymer,
  B) from 10 to 70% by weight of microcapsules with a capsule core made of latent-heat-accumulator material and a polymer as capsule wall, where the latent-heat-accumulator material has its solid/liquid phase transition in the temperature range from −20° C. to 120° C., and
  C) from 0 to 60% by weight of one or more further additives,
where each of the percentages by weight is based on the total weight of components A) to C) and these give a total of 100% by weight,
obtainable via mixing in the melt of components A), B), and optionally C) in a multiscrew extruder, where the multiscrew extruder comprises, along the direction of conveying, in this sequence, at least one feed zone, one plastifying zone, one homogenizing zone, and one discharge zone, and the feed of the microcapsules B) into the multiscrew extruder takes place at a site after—in the direction of conveying—the plastifying zone. The present invention also provides a process for producing the composition, and the use of the composition for producing fibers, foils, moldings, and foams.

Component A: Thermoplastic Polymer

In principle, any of the thermoplastic polymers known to the person skilled in the art and described in the literature is suitable as component A) of the thermoplastic molding compositions. The person skilled in the art understands thermoplastic polymer to mean polymers which in the softened state are processed via compression molding, extrusion, injection molding or other shaping processes, to give moldings. Thermoplastic polymers are used here in the form of solids, generally in the form of granulated materials.

Examples of materials suitable as component A) are
  polyolefins, such as polyethylene and polypropylene,
  polyoxymethylene,
  polyvinyl chloride,
  styrene polymers, such as polystyrene (impact-resistant or not impact-modified),
  impact-modified vinylaromatic copolymers, such as ABS (acrylonitrile-butadiene-styrene), ASA (acrylonitrile-styrene-acrylate), and MABS (transparent ABS, comprising methacrylate units),
  styrene-butadiene block copolymers ("SBC"), in particular thermoplastic elastomers based on styrene ("S-TPE"),
  polyamides, polyesters, such as polyethylene terephthalate (PET), polyethylene terephthalate glycol (PETG), and polybutylene terephthalate (PBT),
polycarbonate,
polymethyl methacrylate (PMMA),
poly(ether) sulfones, and
polyphenylene oxide (PPO), and
thermoplastic polyurethanes (TPU).

The microcapsules, component B)

The microcapsules used in the invention comprise a capsule core made of latent-heat-accumulator material and a capsule wall made of polymer. The capsule core is predominantly composed of more than 90% by weight of latent-heat-accumulator material. The capsule core here can be either solid or liquid, as a function of the temperature.

A protective colloid is generally concomitantly incorporated into the capsule wall as a result of the production process, and can therefore likewise be a constituent of the capsule wall. The protective colloid is generally in particular present at the surface of the polymer. By way of example, up to 10% by weight, based on the total weight of the microcapsules, can be protective colloid.

The average particle size of the capsules (Z average by means of light scattering) is from 0.5 to 50 μm, preferably from 0.5 to 10 μm. The ratio by weight of capsule core to capsule wall is generally from 50:50 to 95:5. Preference is given to a core/wall ratio of from 70:30 to 93:7.

Latent-heat-accumulator materials are defined as substances which exhibit a phase transition in the temperature range within which heat transfer is intended, and the literature therefore also often refers to these as PCM (phase change material). The heat-accumulation property derives from the enthalpy of conversion (enthalpy of fusion) arising during the solid/liquid phase transition, and implying absorption or dissipation of energy to the environment at a constant temperature. In the invention, the latent-heat-accumulator materials exhibit their solid/liquid phase transition in the temperature range from −20° C. to 120° C., preferably from 10 to 100° C. They can thus be used to keep temperature constant within a specified temperature range. The latent-heat-accumulator material is preferably an organic lipophilic substance.

Examples that may be mentioned are:
Aliphatic hydrocarbon compounds, e.g. branched or preferably linear, saturated or unsaturated $C_{10}$-$C_{40}$-hydrocarbons, aromatic hydrocarbon compounds, saturated or unsaturated $C_6$-$C_{30}$-fatty acids, fatty alcohols, and also what are known as oxo alcohols, obtained via hydroformylation of α-olefins and further reactions, ethers of fatty alcohols, $C_6$-$C_{30}$-fatty amines, esters, e.g. $C_1$-$C_{10}$-alkyl esters of fatty acids, e.g. propyl palmitate, methyl stearate, or methyl palmitate, and also preferably their eutectic mixtures, or methyl cinnamate, natural and synthetic waxes, and the halogenated hydrocarbons listed in WO 2009/077525, the disclosure of which is expressly incorporated herein by way of reference.

Mixtures of said substances are moreover suitable, as long as the resultant lowering of melting point does not go beyond the desired range, and as long as the heat of fusion of the mixture is not too small for useful application.

It is advantageous by way of example to use pure n-alkanes, n-alkanes with purity greater than 80%, or the alkane mixtures produced as industrial distillate and commercially available as such.

It can moreover be advantageous to add, to the lipophilic substances, compounds which are soluble therein, in order to inhibit the crystallization delay which sometimes occurs with the nonpolar substances. As described in U.S. Pat. No. 5,456, 852, it is advantageous to use compounds whose melting point is higher by from 20 to 120 K than that of the actual core substance. Suitable compounds are the substances mentioned above as lipophilic substances in the form of fatty acids, fatty alcohols, fatty amides, and also aliphatic hydrocarbon compounds. The amounts added of these, based on the capsule core, are from 0.1 to 10% by weight.

The latent-heat-accumulator materials are selected as a function of the temperature range within which the heat accumulation is desired.

By way of example, heat accumulators with a solid/liquid phase transition at from 50° C. to 90° C. are used in heat-retention molds for food.

Preferred latent-heat-accumulator materials are aliphatic hydrocarbons, particularly preferably those listed above by way of example. In particular, preference is given to aliphatic hydrocarbons having from 14 to 20 carbon atoms, and also to mixtures of these.

The polymer used for the capsule wall may in principle comprise any of the materials known for the microcapsules for copying papers. By way of example, it is possible to encapsulate the latent-heat-accumulator materials in gelatin with other polymers according to the processes described in GB-A 870476, U.S. Pat. No. 2,800,457, U.S. Pat. No. 3,041, 289.

Wall materials which are preferred because they are highly resistant to ageing are thermoset polymers. Thermoset wall materials here are those which have a high degree of crosslinking and therefore do not soften but instead decompose at high temperatures. Examples of suitable thermoset wall materials are highly crosslinked formaldehyde resins, highly crosslinked polyureas, and highly crosslinked polyurethanes, and also highly crosslinked methacrylate polymers, and also uncrosslinked methacrylate polymers.

Formaldehyde resins are products of the reaction of formaldehyde with
triazines, such as melamine
carbamides, such as urea
phenols, such as phenol, m-cresol, and resorcinol
amino and amido compounds, such as aniline, p-toluenesulfonamide, ethyleneurea, and guanidine,
or a mixture of these.

Preferred formaldehyde resins serving as capsule wall material are urea-formaldehyde resins, urea-resorcinol-formaldehyde resins, urea-melamine resins, and melamine-formaldehyde resins. Preference is also given to the $C_1$-$C_4$-alkyl, in particular methyl ethers of these formaldehyde resins, and also to mixtures with these formaldehyde resins. Particular preference is given to melamine-formaldehyde resins and/or their methyl ethers.

In the processes known from copying papers, the resins are used in the form of prepolymers. The prepolymer remains soluble in the aqueous phase and migrates in the course of the polycondensation to the phase boundary and encloses the oil droplets. Processes for microencapsulation with formaldehyde resins are well known and are described by way of example in EP-A-562 344 and EP-A-974 394.

Capsule walls composed of polyureas and of polyurethanes are likewise known from copying papers. The capsule walls are produced via reaction of $NH_2$— or OH-bearing reactants with di- and/or polyisocyanates. Examples of suitable isocyanates are ethylene diisocyanate, tetramethylene 1,4-diisocyanate, hexamethylene 1,6-diisocyanate, and tolylene 2,4- and 2,6-diisocyanate. Mention may also be made of polyisocyanates, such as derivatives having biuret structure, polyuretonimines, and isocyanurates. Reactants which may be used are: hydrazine, guanidine, and its salts, hydroxylamine, di- and polyamines, and amino alcohols.

These interfacial polyaddition processes are disclosed by way of example in U.S. Pat. No. 4,021,595, EP-A 0 392 876 and EP-A 0 535 384.

Preference is given to microcapsules whose capsule wall is an uncrosslinked or crosslinked polymer based on acrylates and/or on methacrylates, or acrylic acid, methacrylic acid, and/or maleic acid.

The polymers of the capsule wall generally comprise at least 30% by weight, preferably at least 40% by weight, particularly preferably at least 50% by weight, particularly at least 60% by weight, and very particularly preferably at least 70% by weight, or else up to 100% by weight, preferably at most 90% by weight, particularly at most 85% by weight, and very particularly preferably at most 80% by weight, of at least one copolymerized monomer from the group comprising $C_1$-$C_{24}$-alkyl esters of acrylic and/or methacrylic acid, acrylic acid, methacrylic acid, and maleic acid (monomers I), based on the total weight of the monomers.

The polymers of the capsule wall moreover preferably comprise at least 10% by weight, preferably at least 15% by weight, with preference at least 20% by weight, and also generally at most 70% by weight, with preference at most 60% by weight, and particularly preferably at most 50% by weight, of one or more copolymerized monomers which bear at least two nonconjugated ethylenic double bonds (monomers II), based on the total weight of the monomers.

The polymers can also comprise up to 40% by weight, preferably up to 30% by weight, particularly up to 20% by weight, of other copolymerized monomers III. The capsule wall is preferably composed only of monomers of groups I and II.

The polymer of the capsule wall of the microcapsules is preferably obtained via free-radical polymerization of
from 30 to 100% by weight of one or more monomers (monomers I) from the group comprising $C_1$-$C_{24}$-alkyl esters of acrylic and/or methacrylic acid, acrylic acid, methacrylic acid, and maleic acid,
from 0 to 70% by weight of one or more monomers (monomers II), which bear at least two nonconjugated ethylenic double bonds, and
from 0 to 40% by weight of one or more other monomers (monomers III),
based in each case on the total weight of the monomers.

Suitable monomers I are $C_1$-$C_{24}$-alkyl esters of acrylic and/or methacrylic acid, and also the unsaturated $C_3$ and $C_4$ carboxylic acids, such as acrylic acid, methacrylic acid, and also maleic acid. Isopropyl, isobutyl, sec-butyl, and tert-butyl acrylate, and the corresponding methacrylates, are suitable monomers I, as also are, these being particularly preferred, methyl, ethyl, n-propyl and n-butyl acrylate, and the corresponding methacrylates. Preference is generally given to the methacrylates and methacrylic acid.

Suitable monomers II are monomers which have at least two nonconjugated ethylenic double bonds. Suitable monomers are generally sparingly soluble or insoluble in water but have good to limited solubility in the lipophilic substance. Sparingly soluble means solubility lower than 60 g/l at 20° C. The monomers II bring about crosslinking of the capsule wall during the polymerization reaction. It is preferable to use monomers having vinyl, allyl, acrylic, and/or methacrylic groups. The monomers preferably have two, three, four, or five nonconjugated ethylenic double bonds. Particular preference is given to monomers II having three or four nonconjugated ethylenic double bonds.

Examples of suitable monomers II are divinylbenzene and divinylcyclohexane, and preferably the diesters of diols with acrylic acid or methacrylic acid, and also the diallyl and divinyl ethers of said diols. Examples that may be mentioned are ethanediol diacrylate, ethylene glycol dimethacrylate, butylene 1,3-glycol dimethacrylate, diethylene glycol diacrylate, dipropylene glycol diacrylate, methallylmethacrylamide, allyl acrylate, and allyl methacrylate. Particular preference is given to propanediol diacrylate, butanediol diacrylate, pentanediol diacrylate, and hexanediol diacrylate, and the corresponding methacrylates.

Other preferred monomers II are the polyesters of polyols with acrylic acid and/or methacrylic acid, and also the polyalkyl and polyvinyl ethers of said polyols. Preference is given to monomers II having three and/or four double bonds capable of free-radical polymerization, e.g. trimethylolpropane triacrylate and -methacrylate, pentaerythritol triallyl ether, pentaerythritol tetraallyl ether, pentaerythritol triacrylate, and pentaerythritol tetraacrylate, and also technical mixtures of these.

Monomers III that can be used are other monomers which differ from the monomers I and II, examples being vinyl acetate, vinyl propionate, vinylpyridine, and styrene, or α-methylstyrene. Particular preference is given to itaconic acid, vinylphosphonic acid, maleic anhydride, 2-hydroxyethyl acrylate, 2-hydroxyethyl methacrylate, acrylamido-2-methylpropanesulfonic acid, methacrylonitrile, acrylonitrile, methacrylamide, N-vinylpyrrolidone, N-methylolacrylamide, N-methylolmethacrylamide, dimethylaminoethyl methacrylate, and diethylaminoethyl methacrylate.

The capsule wall of the microcapsules is preferably obtained via free-radical polymerization of
from 40 to 70% by weight of one or more monomers (monomers I) from the group comprising of $C_1$-$C_{24}$-alkyl esters of acrylic and/or methacrylic acid, acrylic acid, methacrylic acid, and maleic acid,
from 30 to 60% by weight of one or more monomers (monomers II) which bear at least three or four nonconjugated ethylenic double bonds, and
from 0 to 40% by weight of one or more other monomers (monomers III),
based in each case on the total weight of the monomers.

The production process for the microcapsules is what is known as in-situ polymerization. The principle of microcapsule formation is based on production of a stable oil-in-water emulsion from the monomers, from a free-radical initiator, from the protective colloid, and from the lipophilic substance to be encapsulated. The polymerization of the monomers is then initiated via heating and optionally is controlled via further increase in temperature, whereupon the resultant polymers form the capsule wall which encloses the lipophilic substance. This general principle is described by way of example in DE-A-10 139 171, the content of which is expressly incorporated herein by way of reference.

The starting emulsion is stabilized with the aid of a protective colloid. WO 2008/071649 mentions suitable organic or inorganic protective colloids, and also the amounts used of these, and the disclosure of that document is hereby incorporated herein by way of reference.

It is also possible to add surfactants for costabilization, preferably nonionic surfactants. Suitable surfactants can be found in "Handbook of Industrial Surfactants", the content of which is expressly incorporated herein by way of reference. The amount that can be used of the surfactants is from 0.01 to 10% by weight, based on the aqueous phase of the emulsion.

The production of the preferred microcapsules based on polymethacrylate is known, as also are the auxiliaries suitable for this purpose, e.g. free-radical initiators and optionally regulators, and EP-A-1 029 018, DE 10 163 162, and WO 2008/071649 describe this; the disclosure of these documents is expressly incorporated herein by way of reference. The peroxo and azo compounds mentioned therein as free-radical initiators for the free-radical polymerization reaction are therefore in particular used, advantageously in amounts of from 0.2 to 5% by weight, based on the weight of the monomers.

The amount of microcapsules in the invention is from 10 to 70% by weight, based on the total weight of components A) to C) of the thermoplastic molding composition. Amounts greater than this generally lead to impairment of the appearance and of the mechanical properties of the thermoplastic molding compositions. Changes in the amount of microcapsules in the direction of smaller proportions are possible without difficulty, but give rise to poorer heat capacities of the thermoplastic molding composition.

The thermoplastic molding compositions of the invention can comprise, as component C), one or more additives different from components A) and B). In principle, any of the additives known to the person skilled in the art and described in the literature and conventional in plastics is suitable. For the purposes of the present invention examples of additives conventional in plastics are stabilizers and oxidation retarders, agents to counteract decomposition by heat and decomposition by ultraviolet light, lubricants and mold-release agents, dies and pigments, and plasticizers, and also fibers, for example glass fibers or carbon fibers.

Examples of oxidation retarders and heat stabilizers which can be added to the thermoplastic molding composition of the invention are halides of metals of group I of the periodic table, e.g. sodium halides, potassium halides, and lithium halides. It is also possible to use zinc fluoride and zinc chloride. Other materials that can be used are sterically hindered phenols, hydroquinones, substituted members of this group, secondary aromatic amines, optionally in conjunction with phosphorus-containing acids and, respectively, salts thereof, and mixtures of said compounds, preferably in concentrations of up to 1% by weight, based on the weight of the thermoplastic molding compositions.

Examples of UV stabilizers are various substituted resorcinols, salicylates, benzotriazoles, and benzophenones, the amounts used of these generally being up to 2% by weight, based on the weight of the thermoplastic molding compositions.

Lubricants and mold-release agents, the amounts of which added can generally be up to 1% by weight, based on the weight of the thermoplastic molding compositions, are stearic acid, stearyl alcohol, alkyl stearates and stearamides, and also esters of pentaerythritol with long-chain fatty acids. It is also possible to use stearates of calcium, of zinc, or of aluminum, or else dialkyl ketones, e.g. distearyl ketone. Particularly suitable materials in the invention are zinc stearate, magnesium stearate, and calcium stearate, and also N,N'-ethylenebisstearamide.

Glass fibers used in the molding compositions of the invention can be any of the glass fibers known to the person skilled in the art and described in the literature (see by way of example Milewski, J. V., Katz, H. S. "Handbook of Reinforcements for Plastics", pp. 233 ff., Van Nostrand Reinholt Company Inc., 1987).

Production of the Thermoplastic Molding Composition

The thermoplastic molding compositions of the invention are obtainable via mixing in the melt of components A), B), and optionally C) in a multiscrew extruder, where the multiscrew extruder comprises, along the direction of conveying, in this sequence, at least one feed zone, one plastifying zone, one homogenizing zone, and one discharge zone, and the feed of the microcapsules B) into the multiscrew extruder takes place at a site after—in the direction of conveying—the plastifying zone.

In the processes of the invention, a melt comprising component A is produced in the absence of component C, and the mixing to incorporate component B into said melt is delayed to a second step that follows. If the intention is to admix one or more components C, this can be achieved in the first step or in the second step, or else in both steps. It is in principle also possible, of course, not to use the entire amount of component A in the first step, but instead to delay feed of some of the amount of said component to the melt to the second step.

Component B can be added either in the form of dispersion or in the form of powder, in particular in the form of powder, to the melt comprising components A and optionally C.

The melt comprising components A and optionally C is produced in the first step in the absence of component B by processes known to the person skilled in the art, for example via mixing of a melt of component A with the further component C in the multiscrew extruder, preferably at temperatures in the range from 100 to 350° C., in particular from 150 to 300° C. The components can be introduced in respectively pure form into the mixing apparatuses. However, it is also possible to begin by premixing individual components and then to carry out mixing with the other components.

In the processes of the invention, component B is incorporated by mixing in the second step into the melt obtained after the first step. (It is also possible in the second step to incorporate partial amounts of component A which have not yet been incorporated in the first step.) The mixing to incorporate component B uses processes known to the person skilled in the art and described above, for example mixing in the melt in multiscrew extruders. The average mixing time to achieve homogeneous mixing both in the first step and in the second step, independently of one another, is generally from 5 seconds to 30 minutes.

In one preferred embodiment of the process of the invention, the thermoplastic molding compositions are produced via mixing in the melt in a multiscrew extruder which comprises, along the direction of conveying, in this sequence, at least one feed zone, one plastifying zone, one homogenizing zone, and one discharge zone, where, after addition of components A to the feed zone in a first step in the absence of component B a melt is produced, and in a second step after addition of component B to the homogenization zone the mixing to incorporate component B into said melt is carried out.

Suitable multiscrew extruders are described by way of example in Saechtling, Kunststoff-Taschenbuch [Plastics Handbook], Hanser Verlag, Munich, Vienna, 26th edition, 1995, pages 191 to 246.

Multiscrew extruders usually have sections of different functionality, known as "zones". (See, for example, Kohlgrüber, Der gleichläufige Doppelschnecken-extruder [Corotating twin-multiscrew extruders], Carl Hanser Verlag. Munich, 2007, pp. 61-75). The various zones of multiscrew extruders are not necessarily identical with the individual components such as barrel sections or screw segments, from which the multiscrew extruders have been assembled. One zone is generally composed of a plurality of components. The individual zones can, depending on function, have various spatial dimensions, for example various lengths or volumes.

Multiscrew extruders usually have one or more of the zones described below.

However, multiscrew extruders can also have zones with a function not explicitly described below.

The feed zone is to be understood to mean that section of a multiscrew extruder in which one or more components, for example a thermoplastically processable polymer, are introduced into the multiscrew extruder. This introduction can be achieved by using a feed device, composed by way of example of an upper aperture in the multiscrew extruder with superposed hopper, so that gravity conveys the feed component into the multiscrew extruder. However, the feed device can also by way of example be composed of a conveying screw or of an extruder, via which the feed component is forced through the feed aperture of the multiscrew extruder.

The plastifying zone (also often termed melting zone) is that section of a multiscrew extruder in which a component, in particular components A, B, and C, is converted to a condition that is moldable by supply of heat, mostly molten or capable of plastic deformation. This is generally achieved via heating or via mechanical introduction of energy. For the introduction of mechanical energy it is possible to use, as plastifying elements, the components familiar to the person skilled in the art, examples being multiscrew elements with very small degree of pitch in the direction of conveying, screw elements with pitch opposed to the direction of conveying, kneading blocks with conveying, neutral, or reverse-conveying pitch, or a combination of these elements. The selection of the type, number, and dimensions of the plastifying elements in the plastifying zone depends on the components of the thermoplastic molding compositions, in particular on the viscosity and softening point, and also the miscibility of the components.

The homogenizing zone is that section of a multiscrew extruder in which one or more components are homogenized, at least one of these being in the condition that is moldable by supply of heat. Said homogenization is mostly achieved via mixing, kneading, or shearing. Examples of suitable mixing, kneading, and shearing elements are kneading blocks having narrow or wide, conveying or non-conveying kneading disks.

The discharge zone is that section of a multiscrew extruder which prepares for discharge of the thermoplastically processable molding composition from the multiscrew extruder, and in which the composition is discharged through the discharge aperture. The discharge zone is mostly composed of a conveying screw and of a closed barrel section terminated by a defined discharge aperture.

A die head is preferably used as discharge aperture and by way of example has been designed in the form of a die plate or die lip, where the dies can be circular (perforated die plate), slot-shaped, or of any other shape. When a die plate is used, the product discharged in the form of a strand is conventionally cooled and pelletized, for example in water.

If the thermoplastically processable molding composition is not first obtained in the form of pellets but is intended for direct further use, another advantageous method is further processing while the material is hot, or direct extrusion of sheets, foils, pipes, and profiles.

A multiscrew extruder can moreover comprise further zones, such as deaeration zones or devolatilization zones, for the dissipation of gaseous constituents, or squeeze zones and dewatering zones, for the removal and discharge of liquid constituents, which can be water or else other substances. WO 98/13412 describes devolatilization zones, squeeze zones, and dewatering zones, and also the apparatus and arrangement used for these, and express reference is therefore made to the above-mentioned specification in relation to said features.

In one preferred embodiment, the feed of the microcapsules B) into the multiscrew extruder takes place in the homogenizing zone and/or in the discharge zone.

As is well known, the various zones of a multiscrew extruder can be individually heated or cooled, in order to set an ideal temperature profile along the direction of conveying. Suitable heating and cooling equipment is known to the person skilled in the art. The temperatures to be selected in any individual case, and the spatial identity dimensions of the individual zones, differ as a function of the chemical and physical properties of the components, and their quantitative proportions. By way of example, the mixing temperatures in the homogenizing zone are generally in the range from 100° C. to 350° C., preferably from 150 to 300° C.

The multiscrew extruders used can comprise twin-screw extruders, which may be corotating and intermeshing, controtating and intermeshing, or else non-intermeshing. Preference is given to use of twin-screw extruders. Particular preference is given to corotating, intermeshing twin-screw extruders.

It is possible to use extruders having screws with small, moderate, or large flight depth (known as "deepcut screws"). The flight depth of the screws to be used depends on the type of machinery. The respective type of machinery to be used depends on the respective task.

The number of flights on the screws of the extruder can vary. It is preferable to use double-flighted screws. However, it is also possible to use screws having other numbers of flights, examples being single-flighted or triple-flighted screws, or screws which have sections with different numbers of flights.

The screw rotation rates of the extruder can vary widely. Suitable rotation rates are in the range from 50 to 1800 rpm, preferably from 100 to 1000 rpm, particularly preferably from 200 to 900 rpm.

In one preferred embodiment of the process of the invention, for the mixing in the melt of components A, B, and optionally C, a multiscrew extruder is used which has an effective length L, where the effective length L is defined as the distance from the first feed device for the addition of components A to the discharge aperture of the extruder in the direction of conveying. The addition of components A and optionally C preferably takes place in the region from 0 L to 0.15 L, where melt is produced in the absence of component B. The subsequent addition of component B and optionally C, and the mixing to incorporate material into the melt comprising component A, preferably takes place in the region from 0.3 L to 0.9 L.

The thermoplastic molding compositions of the invention can be used for producing moldings, fibers, and foils. In particular, they are used for producing moldings, e.g. for motor-vehicle components, or in electronic equipment.

Use of the Thermoplastic Molding Compositions

The thermoplastic molding compositions can be used in the invention for producing fibers, foils, moldings, and foams. These exhibit increased heat capacity with good appearance of the surface and with good mechanical properties. The present invention further provides fibers, foils, moldings, and foams obtainable from the thermoplastic molding compositions of the invention.

The examples below provide further explanation of the invention.

EXAMPLES

Examples 1-7

Production of the thermoplastic molding composition and determination of properties thereof:
Component A
A low-density polyethylene (LDPE) with MFR (ISO 1133, 190° C., 2.16 kg) 0.25 g/10 min. (Lupolen 1840 D, Lyondell-Basell)
Component B
Microcapsules (produced as in example 1 of European Application 10160998.0 with a wall polymer made of 66 parts by weight of methyl methacrylate and 44 parts by weight of pentaerythritol tetraacrylate with hexadecane as latent-heat-accumulator material and with an average particle size of 7 µm.

The amounts specified in table 1 of components A and B were fed into a stationary-state continuously operated twin-screw extruder (the effective length L of the extruder was 33 times the multiscrew diameter (33 D)). The microcapsules were fed in region 0.45 L. The barrel temperature of the extruder was from 160-180° C. The melt discharged from the extruder was discharged by way of a sheet die, thus producing sheets of thickness about 5 mm.

TABLE 1

Constitution of the thermoplastic molding compositions

| Example | Parts by weight of PE (A) | Parts by weight of microcapsules (B) | Comment |
|---|---|---|---|
| Standard (not of the invention) | 100 | 0 | Sheet acceptable |
| 1 | 90 | 10 | Sheet acceptable |
| 2 | 80 | 20 | Sheet acceptable |
| 3 | 70 | 30 | Sheet acceptable |
| 4 | 60 | 40 | Sheet acceptable |
| 5 | 50 | 50 | Sheet acceptable |
| 6 | 40 | 60 | Sheet acceptable |
| 7 | 30 | 70 | Sheet surface exhibits incipient foaming |

The appearance of the sheet, in particular its surface, was evaluated. The standard used comprised a sheet produced without addition of any microcapsules.

Examples 8 and 9

Component A

A polyoxymethylene (POM) with MVR (ISO 1133, 190° C., 2.16 kg) 7.5 cm³/10 min.
Component B
Microcapsules (produced as in example 1 of European Application 10160998.0 with a wall polymer made of 66 parts by weight of methyl methacrylate and 44 parts by weight of pentaerythritol tetraacrylate with hexadecane as latent-heat-accumulator material and with an average particle size of 7 µm.

The amounts specified in table 2 of components A and B were fed into a stationary-state continuously operated twin-screw extruder (the effective length L of the extruder was 33 times the multiscrew diameter (33 D)). The microcapsules were fed in region 0.45 L. The barrel temperature of the extruder was 160° C. and, respectively, 190° C. Melt discharged from the extruder was molded by way of a die head to give strands, which were cooled in the water bath and then granulated.

TABLE 2

Constitution of the thermoplastic molding compositions

| Example | Parts by weight of POM (A) | Parts by weight of microcapsules (B) | Comment |
|---|---|---|---|
| 8 | 50 | 50 | Barrel temperature 160° C., strand acceptable |
| 9 | 50 | 50 | Barrel temperature 190° C., strand acceptable |

This application claims priority from U.S. provisional application No. 61/416,762, incorporated herein by reference.

The invention claimed is:

1. A process for producing a thermoplastic molding composition comprising
of from 30 to 90% by weight of a thermoplastic polymer,
of from 10 to 70% by weight of microcapsules comprising a capsule core comprising a latent-heat-accumulator material and a polymer as capsule wall, and
of from 0 to 60% by weight of a further additive,
wherein each percentage by weight is based on a total of 100% by weight of the thermoplastic polymer, the microcapsules, and the additive,
the process comprising mixing in a melt of the thermoplastic polymer, the microcapsules, and optionally the additive in a multiscrew extruder, wherein the multiscrew extruder comprises, along a direction of conveying, in this sequence, a feed zone, a plastifying zone, a homogenizing zone, and a discharge zone, and
feeding the microcapsules into the multiscrew extruder at a site after—in the direction of conveying—the plastifying zone,
and wherein at least part of the thermoplastic polymer is fed into the multiscrew extruder at the feed zone.

2. The process according to claim 1, wherein the thermoplastic polymer is at least one selected from the group consisting of a polyolefin, a polyoxymethylene, a polyvinyl chloride, a styrene polymer, an impact-modified vinylaromatic copolymer, a styrene-butadiene block copolymer, a polyamide, a polyester, a polycarbonate, a polymethyl methacrylate, a poly(ether) sulfone, a polyphenylene oxide, and a thermoplastic polyurethane.

3. The process according to claim 1, wherein an average particle size of the capsules is from 0.5 to 50 µm.

4. The process according to claim 1, wherein the latent-heat-accumulator material is an organic lipophilic substance with a solid/liquid phase transition in a temperature range from 10 to 120° C.

5. The process according to claim 1, wherein the capsule wall of the microcapsules is obtained by free-radical polymerization of
from 30 to 100% by weight of at least one monomer selected from the group consisting of a $C_1$-$C_{24}$-alkyl ester of acrylic acid, a $C_1$-$C_{24}$-alkyl ester of methacrylic acid, acrylic acid, methacrylic acid, and maleic acid,
from 0 to 70% by weight of a second monomer comprising at least two nonconjugated ethylenic double bonds, and
from 0 to 40% by weight of a third monomer, wherein each percentage by weight is based on a total of 100% by weight of the monomers.

6. The process according to claim 1, wherein the capsule wall of the microcapsules is obtained by free-radical polymerization of
from 40 to 70% by weight of at least one monomer selected from the group consisting of a $C_1$-$C_{24}$-alkyl ester of acrylic acid, a $C_1$-$C_{24}$-alkyl ester of methacrylic acid, acrylic acid, methacrylic acid, and maleic acid,
from 30 to 60% by weight of a second monomer comprising at least three or four nonconjugated ethylenic double bonds, and
from 0 to 40% by weight of a third monomer,
wherein each percentage by weight is based on a total of 100% by weight of the monomers.

7. The process according to claim 1, wherein the feeding of the microcapsules takes place in the homogenizing zone, in the discharge zone, or both.

8. The process according to claim 1, wherein
the feeding of the microcapsules takes place in a multiscrew extruder of effective length L,
wherein
the effective length L is defined as a distance from a first feed device for the addition of the thermoplastic polymer to a discharge aperture in a direction of conveying, and
a melt is produced after addition of the thermoplastic polymer and optionally the additive in a region from 0 L to 0.15 L, and
the mixing to incorporate the microcapsules and optionally the additive into the melt is carried out in a region from 0.3 L to 0.9 L.

9. The process according to claim 2, wherein an average particle size of the capsules is from 0.5 to 50 μm.

10. The process according to claim 2, wherein the latent-heat-accumulator material is an organic lipophilic substance with a solid/liquid phase transition in a temperature range from 10 to 120° C.

11. The process according to claim 3, wherein the latent-heat-accumulator material is an organic lipophilic substance with a solid/liquid phase transition in a temperature range from 10 to 120° C.

12. The process according to claim 2, wherein the thermoplastic polymer is an impact-modified vinylaromatic copolymer, wherein the copolymer is at least one selected from the group consisting of an acrylonitrile-butadiene-styrene, an acrylonitrile-styrene-acrylate, and a transparent acrylonitrile-butadiene styrene comprising a methacrylate unit.

13. The process according to claim 1, wherein an average particle size of the capsules is from 0.5 to 10 μm.

14. The process according to claim 2, wherein an average particle size of the capsules is from 0.5 to 10 μm.

15. The process according to claim 1, wherein the latent-heat-accumulator material is an organic lipophilic substance with a solid/liquid phase transition in a temperature range from 10 to 100° C.

16. The process according to claim 2, wherein the latent-heat-accumulator material is an organic lipophilic substance with a solid/liquid phase transition in a temperature range from 10 to 100° C.

17. The process according to claim 3, wherein the latent-heat-accumulator material is an organic lipophilic substance with a solid/liquid phase transition in a temperature range from 10 to 100° C.

* * * * *

UNITED STATES PATENT AND TRADEMARK OFFICE
CERTIFICATE OF CORRECTION

Page 1 of 1

PATENT NO. : 8,957,122 B2
APPLICATION NO. : 13/988419
DATED : February 17, 2015
INVENTOR(S) : Stephan Altmann et al.

It is certified that error appears in the above-identified patent and that said Letters Patent is hereby corrected as shown below:

On the title page, insert after Item (22) Item (60), Related U.S. Application Data Information --Related U.S. Application Data

(60) Provisional application No. 61/416,762, filed on Nov. 24, 2010--

Signed and Sealed this
Twenty-third Day of June, 2015

Michelle K. Lee
*Director of the United States Patent and Trademark Office*